United States Patent
Matsuura et al.

(10) Patent No.: US 10,479,843 B2
(45) Date of Patent: Nov. 19, 2019

(54) METHOD FOR PRODUCING NATURAL RUBBER

(71) Applicant: SUMITOMO RUBBER INDUSTRIES, LTD., Kobe-shi, Hyogo (JP)

(72) Inventors: Ai Matsuura, Kobe (JP); Lucksanaporn Tarachiwin, Rayong (TH); Kamalin Kanyawararak, Rayong (TH); Hironori Inamoto, Kobe (JP); Noa Kaneko, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/555,868

(22) PCT Filed: Mar. 17, 2016

(86) PCT No.: PCT/JP2016/058465
§ 371 (c)(1),
(2) Date: Sep. 5, 2017

(87) PCT Pub. No.: WO2016/158442
PCT Pub. Date: Oct. 6, 2016

(65) Prior Publication Data
US 2018/0066075 A1 Mar. 8, 2018

(30) Foreign Application Priority Data
Apr. 2, 2015 (JP) .................. 2015-076038

(51) Int. Cl.
*C08C 3/00* (2006.01)
*C08C 3/02* (2006.01)
*C08J 3/26* (2006.01)
*C08L 7/00* (2006.01)

(52) U.S. Cl.
CPC .............. *C08C 3/00* (2013.01); *C08C 3/02* (2013.01); *C08J 3/26* (2013.01); *C08L 7/00* (2013.01)

(58) Field of Classification Search
CPC ...... C08C 3/00; C08C 3/02; C08J 3/26; C08L 7/00

USPC ......................................... 524/572
See application file for complete search history.

(56) References Cited

U.S. PATENT DOCUMENTS

| | | | |
|---|---|---|---|
| 2006/0189732 A1 | 8/2006 | Kanenari et al. | |
| 2013/0303686 A1* | 11/2013 | Kawashima | B60C 1/00 524/575.5 |

FOREIGN PATENT DOCUMENTS

| | | |
|---|---|---|
| EP | 0950485 A1 | 10/1999 |
| JP | 4-89848 A | 3/1992 |
| JP | 8-81504 A | 3/1996 |
| JP | 11-292902 A | 10/1999 |
| JP | 3573498 B2 | 10/2004 |
| JP | 3654934 B2 | 6/2005 |
| JP | 2005-194503 A | 7/2005 |
| JP | 3750100 B2 | 3/2006 |
| JP | 2012-116970 A | 6/2012 |
| JP | 2012-149145 A | 8/2012 |
| JP | 5312439 B2 | 10/2013 |
| JP | 2013-249410 A | 12/2013 |
| JP | 2013-249411 A | 12/2013 |

OTHER PUBLICATIONS

Sakdapipanich et al., "Natural Rubber: Biosynthesis, Structure, Properties and Application," RSC Polymer Chemistry Series No. 7, Natural Rubber Materials, vol. 1: Blends and IPNs, Royal Society of Chemistry, pp. 28-29. (Year: 2014).*
International Search Report, issued in PCT/JP2016/058465, PCT/ISA/210, dated Apr. 12, 2016.
Written Opinion of the International Searching Authority, issued in PCT/JP2016/058465, PCT/ISA/210, dated Apr. 12, 2016.

* cited by examiner

*Primary Examiner* — Josephine L Chang
(74) *Attorney, Agent, or Firm* — Birch, Stewart, Kolasch & Birch LLP

(57) ABSTRACT

The present invention provides a method for producing natural rubber with which the odors of solid natural rubber is easily reduced, and further which does not degrade physical properties such as heat aging resistance. The present invention relates to a method for producing natural rubber, the method including a sheeting step including sheeting a non-deproteinized solid natural rubber to form a natural rubber sheet, the natural rubber sheet having a moisture content of 20% or less.

6 Claims, No Drawings

METHOD FOR PRODUCING NATURAL RUBBER

TECHNICAL FIELD

The present invention relates to a method for producing natural rubber.

BACKGROUND ART

The natural rubber (NR) used in the rubber industry is produced by solidification of the sap (latex) extracted from rubber trees called *Hevea brasiliensis* which are cultivated in tropical zones. Latex may be solidified, for example, by coagulating latex using acids such as formic acid and drying the coagula; or by allowing latex to naturally coagulate in latex collection cups at rubber plantations or coagulating latex with acids added to the cups to obtain cup lumps, and subjecting the cup lumps to repeated milling and washing, followed by drying and then pressing to produce natural rubber.

The natural rubber produced as described above contains, in addition to a polyisoprene component, many non-rubber components such as proteins, lipids, and saccharides. For this reason, these components can decay and emit offensive odors during the storage period prior to drying. Particularly in the case of cup lumps, the odor problem is more likely to occur because they contain a very large amount of non-rubber components, and they are stored for a long time at plantations and processing plants and during transportation and other stages. Nevertheless, due to their easy production and cost effectiveness, natural rubber produced from cup lumps has recently been widely used in tire applications. The odors of decayed natural rubber cause adverse effects, e.g. on the working environment and the surrounding environment not only of natural rubber processing plants but also of factories for manufacturing rubber products such as tires.

The following techniques for solving the odor problem of natural rubber have been proposed: a technique for reducing the odors by reacting natural rubber latex with proteases and surfactants to remove proteins which are one of the causes of decay (see, for example, Patent Literature 1); and a technique for reducing the rubber odors by adding inorganic salts and proteases to the serum separated during concentration and purification of natural rubber latex into natural rubber to produce natural rubber fine particles (see, for example, Patent Literature 2).

Moreover, Patent Literature 3 discloses a technique for reducing the odors by reducing the drying temperature in the production of natural rubber. Also proposed is a technique for reducing the odor components by immersing coagulated natural rubber latex in an alkali solution such as aqueous sodium hydroxide or aqueous potassium hydroxide (see, for example, Patent Literatures 4 and 5).

CITATION LIST

Patent Literature

Patent Literature 1: JP 3654934 B
Patent Literature 2: JP 3750100 B
Patent Literature 3: JP 5312439 B
Patent Literature 4: JP 3573498 B
Patent Literature 5: JP 2013-249411 A

SUMMARY OF INVENTION

Technical Problem

As described above, various studies have been made to remove the odors of natural rubber. For example, the technique of removing proteins from natural rubber latex or serum by treatment with proteases as disclosed in Patent Literatures 1 and 2 can be applied only when liquid raw materials such as latex or serum are used, and cannot be used to reduce the odors of solid natural rubber such as cup lumps. Moreover, the technique of reducing the drying temperature in the production of natural rubber as disclosed in Patent Literature 3 reduces productivity in natural rubber processing plants, and thus it is impossible to simultaneously achieve odor amelioration and productivity improvement. Furthermore, according to the technique of treating coagulated rubber with strong alkali solutions such as aqueous sodium hydroxide or aqueous potassium hydroxide as disclosed in Patent Literatures 4 and 5, the odors can be reduced; however, the present inventors have found as a result of investigations that degradation or other changes of rubber can occur during the drying after the treatment, and thus it is impossible to simultaneously achieve odor reduction and retention of natural rubber properties.

Hence, no technique has yet been developed which easily reduces the odors of easily available solid natural rubber while maintaining its physical properties.

The present invention aims to solve the problem and provide a method for producing natural rubber with which the odors of solid natural rubber is easily reduced, and further which does not degrade physical properties such as heat aging resistance.

Solution to Problem

The present invention relates to a method for producing natural rubber, including a sheeting step including sheeting a non-deproteinized solid natural rubber to form a natural rubber sheet, the natural rubber sheet having a moisture content of 20% or less.

The natural rubber sheet preferably has a moisture content of 15% or less.

The production method preferably further includes a base treatment step including bringing the natural rubber sheet into contact with a basic solution.

The basic solution preferably contains at least one basic inorganic substance selected from the group consisting of metal carbonates, metal hydrogen carbonates, metal phosphates, and ammonia.

The basic solution preferably further contains a surfactant.

Advantageous Effects of Invention

The method for producing natural rubber of the present invention includes a sheeting step including sheeting a non-deproteinized solid natural rubber to form a natural rubber sheet having a moisture content of 20% or less. With such a method, it is possible to easily reduce the odors of solid natural rubber and also to maintain physical properties such as heat aging resistance without degrading them.

DESCRIPTION OF EMBODIMENTS

The method for producing natural rubber of the present invention includes a sheeting step including sheeting a non-deproteinized solid natural rubber to form a natural rubber sheet. The method of the present invention may include other steps such as a base treatment step, a pH adjustment step, and a washing step, which will be described later, as long as it includes the above step. Each step may be performed once or repeated multiple times.

The solid natural rubber to be subjected to the sheeting step in the present invention is a non-deproteinized natural rubber. Specifically, the solid natural rubber to be subjected to the sheeting step may be any coagulum obtained by coagulating non-deproteinized natural rubber latex. The deproteinization refers to, for example, a treatment to decompose proteins using strong alkalis such as sodium hydroxide or proteases. Thus, the solid natural rubber used in the present invention is a coagulum obtained by coagulating natural rubber latex that has not undergone such a proteolytic treatment. Examples of the solid natural rubber include coagulated rubber latex obtained by coagulating natural rubber latex with acids such as formic acid, cup lumps, tree lace, cup lumps solidified with field latex (slabs), natural rubber processed as TSR, and mixtures thereof. In another suitable embodiment of the present invention, the solid natural rubber is a cup lump, among others, because it contains a large amount of non-rubber components, and it tends to be stored for a longer period of time.

The solid natural rubber preferably has a nitrogen content of 0.20% by mass or more, more preferably 0.25% by mass or more, still more preferably 0.30% by mass or more. Since the solid natural rubber to be subjected to the sheeting step is not deproteinized, it at least has a nitrogen content of 0.20% by mass or more. The nitrogen content can be measured by conventional methods such as the Kjeldahl method. The nitrogen is derived from proteins.

Natural rubber latex is collected as sap of rubber trees such as *hevea* trees. It contains a rubber component and other components, such as water, proteins, lipids, and inorganic salts. The gel fraction in rubber is considered to be a complex of various impurities therein. The natural rubber latex used may be, for example, a raw latex (field latex) taken from *hevea* trees by tapping, or a concentrated latex prepared by centrifugation or creaming (e.g. purified latex, high-ammonia latex prepared by adding ammonia in a conventional manner, and LATZ latex stabilized with zinc oxide, TMTD, and ammonia).

The cup lump may be, for example, a coagulated natural rubber obtained by allowing natural rubber latex accumulated in cups for collecting natural rubber to be naturally coagulated by the action of fatty acids produced in the decomposition of non-rubber components by microorganisms, or a coagulated natural rubber obtained by previously placing an agent capable of coagulating natural rubber latex in the cups and thereby forcing natural rubber latex to rapidly coagulate. The agent capable of coagulating natural rubber latex may be any agent having such a capability, and examples include acids such as sulfuric acid, formic acid, hydrochloric acid, and acetic acid, cations such as calcium ion and salts thereof, and organic solvents such as methanol and ethanol.

The solid natural rubber to be subjected to the sheeting step may be in any form such as a block or granular form. Specifically, the solid natural rubber is preferably in the form of a block having a length at its longest side of 30 cm or less, more preferably 20 cm or less, still more preferably 10 cm or less, particularly preferably 1 cm or less. The solid natural rubber having a moderate size as indicated above can be prepared by milling and/or cutting a large mass of solid natural rubber.

The sheeting step is preferably performed within two weeks of the coagulation of natural rubber latex, more preferably within one week, particularly preferably within three days. In such cases, it is possible to effectively prevent the generation of odors due to the decay during storage.

The sheeting step includes sheeting the non-deproteinized solid natural rubber to form a natural rubber sheet.

The odors of natural rubber are considered to be derived from the odor-causing substances, lower fatty acids, produced by the decay of non-rubber components in natural rubber, such as proteins, lipids, and saccharides, during storage. Hence, by sheeting the non-deproteinized solid natural rubber to reduce the moisture content, the decay of the natural rubber during the subsequent storage, if performed, can be reduced so that the production of odor-causing lower fatty acids is reduced, and therefore the odors can be reduced. In addition to reducing the moisture content, the sheeting process also seems to improve ventilation during storage and suppress the progress of decay.

Furthermore, since sheeting is simply performed, it is also possible to maintain physical properties such as heat aging resistance without degrading them.

In the sheeting step, the non-deproteinized solid natural rubber may be sheeted by any method that produces a natural rubber sheet, including conventional methods used to form rubber into a sheet. Specifically, an exemplary method may include sheeting by passing through a roller.

The natural rubber sheet preferably has a thickness of 3 cm or less. When the natural rubber sheet has such a thickness, the above-described advantageous effects of the sheeting process can be sufficiently achieved. The thickness is more preferably 2 cm or less, still more preferably 1 cm or less, while the lower limit of the thickness is not particularly limited, but is preferably 5 mm or more from the standpoint of processability.

According to the production method of the present invention, a non-deproteinized solid natural rubber is sheeted to reduce the moisture content of the resulting natural rubber sheet, and thus the decay of the natural rubber during storage, if performed, can be reduced, whereby the odors can be reduced. The natural rubber sheet has a moisture content of 20% or less. When the natural rubber sheet has a moisture content falling within the above range, the progress of decay during storage can be suppressed and the above-described advantageous effects of the sheeting process can be sufficiently achieved. The moisture content is preferably 15% or less, while the lower limit of the moisture content is not particularly limited, and is desirably as low as possible. From the standpoint of efficiency in controlling the moisture content, it is preferably 3% or more, more preferably 5% or more, still more preferably 10% or more.

The moisture content can be determined from the difference in the weight of the natural rubber sheet before and after sufficient drying, as described later in EXAMPLES.

The moisture content of the natural rubber sheet may not be reduced to 20% or less by performing the sheeting step only once, depending on the conditions of the solid natural rubber to be subjected to the sheeting step. The moisture content can be adjusted to 20% or less, for example, by repeating the sheeting step multiple times or subjecting the natural rubber sheet obtained by the sheeting step to an appropriate treatment such as drying. Thus, the production method of the present invention may include a drying step including drying the natural rubber sheet obtained by the sheeting step, if necessary.

It is sufficient that the moisture content of the natural rubber sheet is determined immediately after the natural rubber sheet is formed by the sheeting step, or immediately after it is dried in the drying step.

According to the production method of the present invention including the sheeting step, even when long-term storage is performed after the sheeting step, the progress of decay can be suppressed and the odors can be reduced. Thus, the effects of the present invention are more remarkable when the natural rubber sheet is stored for a long period after the sheeting step.

The production method preferably further includes a base treatment step including bringing the natural rubber sheet into contact with a basic solution. Specifically, the sheeting step is preferably followed by a base treatment step including bringing the natural rubber sheet obtained in the sheeting step into contact with a basic solution. With the production method of the present invention including the sheeting step, the decay of the natural rubber sheet during storage, if performed, can be reduced so that the production of odor-causing lower fatty acids is reduced, and therefore the odors can be reduced; however, the production of lower fatty acids still cannot be completely prevented. Then, by bringing the stored natural rubber sheet into contact with a basic solution, the small amount of lower fatty acids produced can be neutralized and removed to further reduce the odors.

When the natural rubber sheet is to be brought into contact with a basic solution in the base treatment step, the natural rubber sheet may be used as it is or may be appropriately cut to any smaller size before the treatment.

In the base treatment step, the natural rubber sheet may be brought into contact with a basic solution, for example, by applying the basic solution to the natural rubber sheet, spraying the basic solution to the natural rubber sheet, e.g. using a spray or shower apparatus, or immersing the natural rubber sheet in the basic solution. From the standpoints of the deodorizing effect and efficiency, it is preferred to immerse the natural rubber sheet in the basic solution.

In the case where the natural rubber sheet is brought into contact with a basic solution by immersing the natural rubber sheet in the basic solution, the natural rubber sheet may only be left in the basic solution. Alternatively, preferably, the immersion is performed under stirring and/or microwave irradiation to further promote the deodorizing effect.

Thus, in another suitable embodiment of the present invention, the base treatment step is performed under microwave irradiation.

The duration of contact between the natural rubber sheet and the basic solution (treatment time) in the base treatment step is not particularly limited, but is preferably 5 minutes or longer, more preferably 10 minutes or longer, still more preferably 30 minutes or longer, particularly preferably 3 hours or longer. When it is shorter than five minutes, the effects of the present invention may not be well achieved. The upper limit of the duration of contact between the natural rubber sheet and the basic solution is not particularly limited as it varies depending on the pH and concentration of the basic solution. From the standpoint of productivity, it is preferably up to 48 hours, more preferably up to 24 hours, still more preferably up to 16 hours.

The temperature of contact between the natural rubber sheet and the basic solution (treatment temperature) in the base treatment step is not particularly limited, but is preferably, for example, 10° C. to 50° C., more preferably 15° C. to 35° C., particularly preferably room temperature (20° C. to 30° C.).

The basic solution preferably contains at least one basic inorganic substance selected from the group consisting of metal carbonates, metal hydrogen carbonates, metal phosphates, and ammonia. When such a basic solution is brought into contact with the natural rubber sheet, it can neutralize and remove more odor components so that the odors of the natural rubber sheet can be further reduced, and further the physical properties such as heat aging resistance can be maintained without degradation.

The basic solution may be, for example, an aqueous solution containing the basic inorganic substance or an alcoholic solution containing the basic inorganic substance, preferably an aqueous solution containing the basic inorganic substance.

The basic solution can be prepared by diluting or dissolving the basic inorganic substance in a solvent such as water or alcohol.

Examples of the metal carbonates include alkali metal carbonates such as lithium carbonate, sodium carbonate, and potassium carbonate; and alkaline-earth metal carbonates such as magnesium carbonate, calcium carbonate, and barium carbonate.

Examples of the metal hydrogen carbonates include alkali metal hydrogen carbonates such as lithium hydrogen carbonate, sodium hydrogen carbonate, and potassium hydrogen carbonate.

Examples of the metal phosphates include alkali metal phosphates such as sodium phosphate and sodium hydrogen phosphate.

These basic inorganic substances may be used alone, or two or more of these may be used in combination.

The basic inorganic substance is preferably a metal carbonate, a metal hydrogen carbonate, or ammonia, more preferably an alkali metal carbonate, an alkali metal hydrogen carbonate, or ammonia, still more preferably sodium carbonate, potassium carbonate, sodium hydrogen carbonate, or potassium hydrogen carbonate, particularly preferably sodium carbonate or sodium hydrogen carbonate.

The concentration of the basic inorganic substance in the basic solution is preferably 0.1% by mass or more, more preferably 0.3% by mass or more, still more preferably 0.5% by mass or more, particularly preferably 1.0% by mass or more based on 100% by mass of the basic solution. When it is less than 0.1% by mass, the basic solution may not neutralize and remove a sufficient amount of odor components. The concentration of the basic inorganic substance is also preferably 20% by mass or less, more preferably 10% by mass or less, still more preferably 5.0% by mass or less, particularly preferably 3.0% by mass or less based on 100% by mass of the basic solution. When it is more than 20% by mass, the basic solution may not further reduce the odor components, despite the large amount of the basic inorganic substance required; thus, an efficiency that is commensurate with the cost tends not to be obtained. Additionally, the physical properties (e.g. heat aging resistance) of the treated rubber may be degraded.

The basic solution preferably further contains a surfactant. Thus, in another suitable embodiment of the present invention, the basic solution contains the basic inorganic substance and a surfactant.

When the basic inorganic substance is contained with a surfactant as described above, the odor-causing components present inside the natural rubber sheet can be easily extracted, and the basic inorganic substance can easily penetrate into the natural rubber sheet; thus, the odor components can be more efficiently neutralized and removed.

The surfactant used may be at least one selected from the group consisting of anionic surfactants, nonionic surfactants, and amphoteric surfactants. Examples of the anionic surfactants include carboxylic acid surfactants, sulfonic acid surfactants, sulfate surfactants, and phosphate surfactants.

Examples of the nonionic surfactants include polyoxyalkylene ester surfactants, polyhydric alcohol fatty acid ester surfactants, glycolipid ester surfactants, and alkylpolyglycoside surfactants.

Examples of the amphoteric surfactants include amino acid surfactants, betaine surfactants, and amine oxide surfactants. Among the foregoing surfactants, anionic surfactants are suitable.

These surfactants may be used alone, or two or more of these may be used in combination.

Suitable examples of the anionic surfactants include alkyl sulfate salts, polyoxyethylene alkyl ether sulfate salts, alkylbenzenesulfonic acid salts, alkylnaphthalenesulfonic acid salts, and fatty acid salts. The foregoing salts may be, for example, alkali metal salts (e.g. sodium salts), ammonium salts, or amine salts (alkanolamine salts such as monoethanolamine, diethanolamine, and triethanolamine salts).

Among these, polyoxyethylene alkyl ether sulfate salts are particularly preferred.

The alkyl sulfate salt may suitably be a higher alkyl sulfate salt (higher alcohol sulfate salt) which is preferably an alkali metal salt such as a sodium salt. The alkyl group in the alkyl sulfate salt preferably has 10 to 20 carbon atoms, more preferably 10 to 16 carbon atoms. Specific examples of the alkyl sulfate salt include sodium lauryl sulfate (sodium dodecyl sulfate), potassium lauryl sulfate, ammonium lauryl sulfate, triethanolamine lauryl sulfate, sodium myristyl sulfate, potassium myristyl sulfate, sodium cetyl sulfate, and potassium cetyl sulfate. Among these, sodium lauryl sulfate is preferred because it has a higher effect in reducing the amount of proteins and the like.

The polyoxyethylene alkyl ether sulfate salt is preferably a salt, more preferably an amine or sodium salt, still more preferably a sodium salt, of a polyoxyethylene alkyl ether sulfate having a C10-C18 alkyl group. The alkyl group preferably has 10 to 14 carbon atoms. The average degree of polymerization of the oxyethylene group is preferably 1 to 10, more preferably 1 to 5. Specific examples of the polyoxyethylene alkyl ether sulfate salt include sodium polyoxyethylene alkyl ether sulfates such as sodium polyoxyethylene lauryl ether sulfate, sodium polyoxyethylene myristyl ether sulfate, and sodium polyoxyethylene oleyl ether sulfate, and triethanolamine polyoxyethylene alkyl ether sulfates. Among these, sodium polyoxyethylene lauryl ether sulfate is preferred because it has a higher effect in reducing the amount of proteins and the like.

The alkylbenzenesulfonic acid salt may be a salt, suitably an alkali metal salt, of an alkylbenzenesulfonic acid having a C3-C20 alkyl group. Specific examples of the alkylbenzenesulfonic acid salt include sodium salts, potassium salts, ammoniumsalts, triethanolaminesalts, andcalciumsalts of dodecylbenzenesulfonic acid, pentadecylbenzenesulfonic acid, decylbenzenesulfonic acid, or cetylbenzenesulfonic acid. Among these, sodium dodecylbenzenesulfonate is preferred because it has a higher effect in reducing the amount of proteins and the like.

Examples of the alkylnaphthalenesulfonic acid salt include alkali metal salts of alkylnaphthalenesulfonic acids, such as sodium mono-, di-, or triisopropylnaphthalenesulfonate, potassium mono-, di-, or triisopropylnaphthalenesulfonate, sodium octylnaphthalenesulfonate, potassium octylnaphthalenesulfonate, sodium dodecylnaphthalenesulfonate, and potassium dodecylnaphthalenesulfonate. Among these, sodium alkylnaphthalenesulfonates are preferred because they have a higher effect in reducing the amount of proteins and the like.

The fatty acid salt may suitably be a salt, e.g. a sodium or potassium salt, of a C10-C20 higher fatty acid. Specific examples of the fatty acid salt include sodium or potassium salts, e.g. of oleic acid, stearic acid, octanoic acid, decanoic acid, dodecanoic acid, tetradecanoic acid, hexadecanoic acid, octadecanoic acid, docosanoic acid, linoleic acid, 2-ethylhexanoic acid, and 2-octylundecanoic acid, and sodium or potassium salts, e.g. of mixed fatty acids derived from coconut oil, palm oil, castor oil, palm kernel oil, beef tallow, or other oils (e.g. castor oil potassium soap). Among these, potassium oleate soap is preferred because it has a higher effect in reducing the amount of proteins and the like.

The concentration of the surfactant in the basic solution is preferably 0.01% by mass or more, more preferably 0.03% by mass or more, still more preferably 0.05% by mass or more based on 100% by mass of the basic solution. When it is less than 0.01% by mass, the basic solution may not neutralize and remove a sufficient amount of odor components. The concentration of the surfactant is also preferably 5% by mass or less, more preferably 3% by mass or less, still more preferably 1% by mass or less, particularly preferably 0.5% by mass or less, most preferably 0.3% by mass or less based on 100% by mass of the basic solution. When it is more than 5% by mass, the basic solution may not further reduce the odor components, despite the large amount of the surfactant required; thus, an efficiency that is commensurate with the cost tends not to be obtained.

The base treatment step, which includes bringing the natural rubber sheet into contact with a basic solution, is preferably followed by the step of washing away the basic solution remaining on the surface of the treated natural rubber.

The washing step may be carried out by any method which can wash away and remove the basic solution remaining on the surface of the treated natural rubber obtained by the base treatment step (also referred to as "base-treated natural rubber"). For example, it may be carried out by diluting the treated natural rubber with water and centrifuging the dilution, or by leaving the treated natural rubber in a water bath so that it floats and then draining only the aqueous phase to take out the natural rubber.

The production method of the present invention may further include a pH adjustment step including adjusting the pH of the base-treated natural rubber obtained by the base treatment step to 2 to 7. Thus, in the present invention, after the treatment with a basic solution, optionally followed by the washing step, the pH of the treated natural rubber may then be adjusted to 2 to 7 to obtain a deodorized natural rubber. In particular, the pH is preferably adjusted to fall within a range of 3 to 6, more preferably 4 to 6. By adjusting the pH of the base-treated natural rubber to fall within the above range, it is possible to allow the deodorizing effect to last long, and to further prevent the degradation of heat aging resistance.

The pH is determined by cutting the base-treated natural rubber into pieces at most 2 mm square on each side, immersing the pieces in distilled water, irradiating the immersed pieces with microwaves for extraction at 90° C. for 15 minutes, and measuring the resulting immersion water with a pH meter.

Regarding the extraction, one-hour extraction, e.g. using an ultrasonic washing device cannot completely extract water-soluble components from the inside of the rubber and thus cannot reveal the pH of the inside accurately. In contrast, when extraction is carried out by the microwave-based extraction technique, the real nature (pH) of the treated natural rubber can be elucidated.

In the pH adjustment step, the pH of the base-treated natural rubber may be adjusted to 2 to 7 by any method, such as by exposing the base-treated natural rubber to an acid atmosphere, or applying an acid compound and/or an acid solution to the base-treated natural rubber, or spraying an acid compound and/or an acid solution to the base-treated natural rubber, e.g. using a spray or shower apparatus, or immersing the base-treated natural rubber in an acid solution. It is preferred to bring the base-treated natural rubber into contact with an acid solution, such as by applying an acid solution to the base-treated natural rubber, spraying an acid solution to the base-treated natural rubber, or immersing the base-treated natural rubber in an acid solution. Thus, in another suitable embodiment of the present invention, the pH adjustment step includes bringing the base-treated natural rubber into contact with an acid solution to adjust the pH to 2 to 7.

Among the above methods, it is particularly preferred from the standpoint of work efficiency to immerse the base-treated natural rubber in an acid solution. With this treatment, it is possible to allow the deodorizing effect to last long, and to further prevent the degradation of heat aging resistance.

The pH of the acid solution is preferably adjusted to 6 or lower before use. When the base-treated natural rubber is brought into contact with such an acid solution, a long-lasting deodorizing effect and excellent heat aging resistance can be obtained. The upper limit of the pH of the acid solution is more preferably 5 or lower, still more preferably 4.5 or lower. The lower limit of the pH is not particularly limited and depends on the duration of contact, but it is preferably 1 or higher, more preferably 2 or higher, because too high acidity can cause rubber degradation and requires a time-consuming effluent treatment process.

In the case where the pH of the base-treated natural rubber is adjusted to 2 to 7 by immersing the base-treated natural rubber in an acid solution, the base-treated natural rubber may only be left in the acid solution. Alternatively, preferably, the immersion is performed under stirring and/or microwave irradiation to further improve the treatment efficiency.

Thus, in another suitable embodiment of the present invention, the pH adjustment step is performed under microwave irradiation.

The duration of contact between the base-treated natural rubber and the acid solution in the pH adjustment step is not particularly limited, but is preferably three seconds or longer, more preferably 10 seconds or longer, still more preferably 30 seconds or longer, furthermore preferably five minutes or longer, particularly preferably 10 minutes or longer, most preferably 30 minutes or longer. When it is shorter than three seconds, insufficient neutralization may occur and the effects of the present invention may not be well achieved. The upper limit of the duration of contact between the base-treated natural rubber and the acid solution is not particularly limited as it varies depending on the pH and concentration of the acid solution. From the standpoints of productivity and work efficiency, it is preferably up to 48 hours, more preferably up to 24 hours, still more preferably up to 10 hours, particularly preferably up to five hours.

The temperature of contact between the base-treated natural rubber and the acid solution (treatment temperature) in the pH adjustment step is not particularly limited, and may be, for example, 10° C. to 50° C., preferably 15° C. to 35° C., particularly preferably room temperature (20° C. to 30° C.).

The acid solution is preferably an acid compound solution. The acid compound solution may be, for example, an aqueous solution of an acid compound or an alcoholic solution of an acid compound, preferably an aqueous solution of an acid compound.

The acid solution can be prepared by diluting or dissolving the acid compound described below in a solvent such as water or alcohol.

Non-limiting examples of the acid compound include inorganic acids such as hydrochloric acid, nitric acid, sulfuric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, glutaric acid, gluconic acid, lactic acid, aspartic acid, glutamic acid, salicylic acid, methanesulfonic acid, itaconic acid, benzenesulfonic acid, toluenesulfonic acid, naphthalenedisulfonic acid, trifluoromethanesulfonic acid, styrenesulfonic acid, trifluoroacetic acid, barbituric acid, acrylic acid, methacrylic acid, cinnamic acid, 4-hydroxybenzoic acid, aminobenzoic acid, naphthalenedisulfonic acid, hydroxybenzenesulfonic acid, toluenesulfinic acid, benzenesulfinic acid, α-resorcylic acid, β-resorcylic acid, γ-resorcylic acid, gallic acid, fluoroglycine, sulfosalicylic acid, ascorbic acid, erythorbic acid, and bisphenol acid. These acid compounds may be used alone, or two or more of these may be used in combination. Among these, the acid compound is preferably sulfuric acid, formic acid, or acetic acid.

The concentration of the acid compound in the acid solution is preferably 0.1% by mass or more, more preferably 0.3% by mass or more, still more preferably 0.5% by mass or more, particularly preferably 1.0% by mass or more based on 100% by mass of the acid solution. The concentration of the acid compound is also preferably 20% by mass or less, more preferably 10% by mass or less, still more preferably 5.0% by mass or less, particularly preferably 3.0% by mass or less based on 100% by mass of the acid solution. When the concentration of the acid compound in the acid solution falls within the above range, better heat aging resistance can be obtained. In contrast, when it is less than 0.1% by mass, the long-lasting deodorizing effect or the effect of improving heat aging resistance may be insufficient, while when it is more than 20% by mass, the physical properties of the treated rubber may be degraded.

The pH adjustment step, which includes adjusting the pH of the base-treated natural rubber to 2 to 7, may be followed by the step of washing away the acid solution remaining on the surface of the deodorized natural rubber. The washing step may be carried out as described above.

EXAMPLES

The present invention will be specifically described with reference to, but not limited to, examples below.

The chemicals used in examples and comparative examples are listed below.

$Na_2CO_3$: sodium carbonate (available from Sigma Aldrich)

$NaHCO_3$: sodium hydrogen carbonate (available from Sigma Aldrich)

E-27C: EMAL E-27C (sodium polyoxyethylene lauryl ether sulfate) available from Kao Corporation <Procurement of Natural Rubber Sample>

Cup lumps (nitrogen content: 0.37% by mass) were procured from a typical rubber plantation.

Comparative Example 1

The cup lump procured as above was stored as received for one month. The moisture content of the cup lump before the storage was measured by the below-described method and found to be 32%.

(Measurement of Moisture Content)

One gram (weight before drying) of the cup lump was accurately weighed, finely cut, and dried at 70° C. for 14 hours. Then, the weight of the dried sample was determined, and the moisture content was calculated using the following equation.

Moisture content (%)=[(weight before drying (g)−weight after drying (g))/weight before drying (g)]×100

Comparative Example 2

The cup lump procured as above was sheeted by passing through a roller to form a sheet having a thickness of 1 cm or less, thereby preparing a natural rubber sheet. The natural rubber sheet was stored at room temperature (20° C. to 30° C.) for one month. The moisture content of the natural rubber sheet before the storage was measured by the below-described method and found to be 27%.

(Measurement of Moisture Content)

One gram (weight before drying) of the natural rubber sheet was accurately weighed, finely cut, and dried at 70° C. for 14 hours. Then, the weight of the dried sample was determined, and the moisture content was calculated using the following equation.

Moisture content (%)=[(weight before drying (g)−weight after drying (g))/weight before drying (g)]×100

Example 1

The cup lump procured as above was sheeted by passing through a roller to form a sheet having a thickness of 1 cm or less, thereby preparing a natural rubber sheet as a sample. The sample was stored at room temperature (20° C. to 30° C.) for one month. The moisture content of the sample before the storage was measured by the below-described method and found to be 16%.

(Measurement of moisture content)

One gram (weight before drying) of the sample was accurately weighed, finely cut, and dried at 70° C. for 14 hours. Then, the weight of the dried sample was determined, and the moisture content was calculated using the following equation.

Moisture content (%)=[(weight before drying (g)−weight after drying (g))/weight before drying (g)]×100

Examples 2 to 6

The cup lump procured as above was sheeted by passing through a roller to form a sheet having a thickness of 1 cm or less, thereby preparing a natural rubber sheet as a sample. The sample was stored at room temperature (20° C. to 30° C.) for one month. The moisture content of the sample before the storage was measured as in Example 1 and shown in Table 1.

An amount of 100 g of the sample stored for one month as described above was immersed in 1 L of an aqueous solution prepared at the concentrations shown in Table 1, at room temperature (20° C. to 30° C.) for the treatment time shown in Table 1. In order to prevent the sample from floating on the surface of the aqueous solution during the immersion, an appropriate weight or the like was placed on the sample so that the entire sample was submerged in the aqueous solution. The sample was taken out, washed with water, and dried at 70° C. for 14 hours to obtain a treated natural rubber.

The stored cup lump obtained in Comparative Example 1, the stored natural rubber sheet obtained in Comparative Example 2, the stored sample obtained in Example 1, and the treated natural rubbers obtained in Examples 2 to 6 were evaluated as follows. Table 1 shows the results.

(Analysis of Odor Components)

The major odor-causing substances in natural rubber include lower fatty acids and aldehydes thereof, such as acetic acid, valeric acid, isovaleric acid, isovaleraldehyde, and butyric acid.

These components were detected using Head-Space GCMS (product name "GCMS-QP2010 Ultra", Shimadzu Corporation, head space sampler "HS-20" available from Shimadzu Corporation) to calculate peak area ratios of the components, which were then corrected by the respective olfactory thresholds and summed as an odor component index. Then, the odor component rate was determined according to the following equation.

Odor component rate (%)=[odor component index of treated natural rubber (stored cup lump in Comparative Example 1, stored natural rubber sheet in Comparative Example 2, or stored sample in Example 1)/odor component index of stored cup lump in Comparative Example 1]×100

(Evaluation of Degradation Properties of Natural Rubber)

The degradation properties of the treated natural rubber (stored cup lump in Comparative Example 1, stored natural rubber sheet in Comparative Example 2, or stored sample in Example 1) were evaluated based on the Mooney viscosity retention after aging at 80° C. for 72 hours according to the equation below. A higher Mooney viscosity retention rate indicates that the treated natural rubber has better degradation properties (heat aging resistance). Specifically, a Mooney viscosity retention rate of 60% or higher indicates sufficiently good degradation properties; 65% or higher indicates better degradation properties; 70% or higher indicates still better degradation properties; 80% or higher indicates even still better degradation properties; 85% or higher indicates excellent degradation properties; and 95% or higher indicates very excellent degradation properties.

Mooney viscosity retention rate (Mw retention rate, %)=(Mooney viscosity after aging/Mooney viscosity before aging)×100

TABLE 1

|  | Comparative Example 1 | Comparative Example 2 | Example 1 | Example 2 | Example 3 | Example 4 | Example 5 | Example 6 |
| --- | --- | --- | --- | --- | --- | --- | --- | --- |
| Sheeting | not performed | performed | performed | performed | performed | performed | performed | performed |
| Moisture content (%) | 32 | 27 | 16 | 18 | 16 | 17 | 17 | 17 |
| Basic inorganic substance | — | — | — | $Na_2CO_3$ | $Na_2CO_3$ | $Na_2CO_3$ | $Na_2CO_3$ | $NaHCO_3$ |
| Concentration of basic inorganic substance in aqueous solution (% by mass) | — | — | — | 1.0 | 1.0 | 3.0 | 1.0 | 1.0 |
| Surfactant | — | — | — | — | E-27C | E-27C | E-27C | E-27C |
| Concentration of surfactant in aqueous solution (% by mass) | — | — | — | — | 0.10 | 0.10 | 0.10 | 0.10 |
| Treatment time (hour) | — | — | — | 6 | 6 | 6 | 1 | 6 |
| Odor component rate (%) | 100 | 91 | 60 | 55 | 50 | 45 | 50 | 55 |
| Mooney viscosity retention rate (%) | 100 | 101 | 107 | 105 | 106 | 103 | 105 | 104 |

The results in Table 1 show that the coagulated solid natural rubbers having undergone the treatment of the present invention (natural rubber sheets having a moisture content of 20% or less) achieved odor reduction and excellent heat aging resistance.

Specifically, when the natural rubber was sheeted to adjust the moisture content to 16% before storage (Example 1), the odor component rate was greatly reduced as compared with when the natural rubber was not sheeted and stored with a moisture content of 32% (Comparative Example 1). In contrast, the odor-reducing effect was low when the natural rubber was sheeted but the natural rubber sheet to be stored had a high moisture content of 27% (Comparative Example 2).

It is also demonstrated that the odor components were greatly reduced in Examples 2 to 6 where the natural rubber sheets were treated according to the concentrations and treatment times shown in Table 1, when compared to Comparative Example 1 where the treatment of the present invention was not performed.

The invention claimed is:

1. A method for producing natural rubber, comprising a sheeting step which includes sheeting a cup lump to form a natural rubber sheet, wherein the natural rubber sheet has a thickness of 3 cm or less and a moisture content of 20% or less.

2. The method for producing natural rubber according to claim 1, wherein the natural rubber sheet has a moisture content of 15% or less.

3. The method for producing natural rubber according to claim 1, further comprising a base treatment step which includes bringing the natural rubber sheet into contact with a basic solution.

4. The method for producing natural rubber according to claim 3, wherein the basic solution contains at least one basic inorganic substance selected from the group consisting of metal carbonates, metal hydrogen carbonates, metal phosphates, and ammonia.

5. The method for producing natural rubber according to claim 3, wherein the basic solution further contains a surfactant.

6. The method for producing natural rubber according to claim 4, wherein the basic solution further contains a surfactant.

* * * * *